April 30, 1957 L. ORR 2,790,398
DOUGH-FORMING MACHINE
Filed Oct. 19, 1954 3 Sheets-Sheet 3
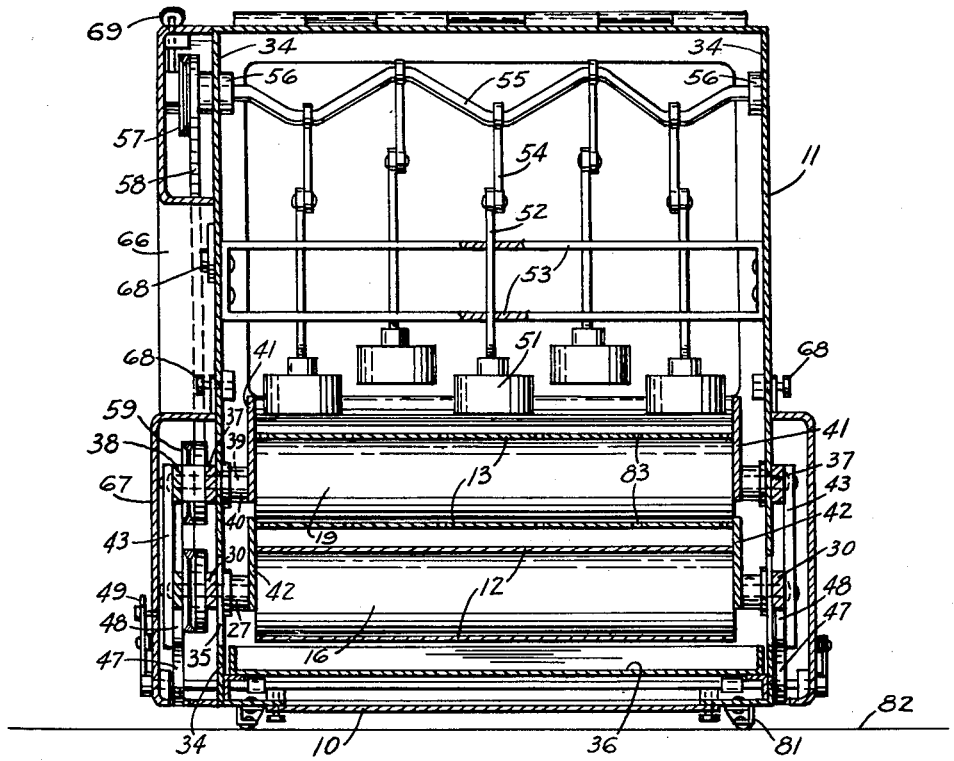
FIG. 3
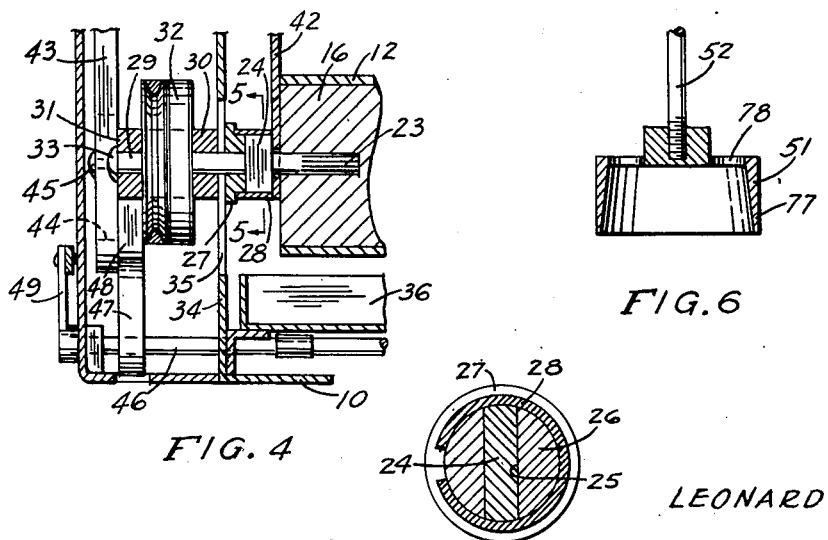
FIG. 4
FIG. 5
FIG. 6
INVENTOR
LEONARD ORR
BY
McMorrow, Berman + Davidson
ATTORNEYS United States Patent Office 2,790,398
Patented Apr. 30, 1957

2,790,398

DOUGH-FORMING MACHINE

Leonard Orr, Chicago, Ill., assignor of twenty-five percent each to Herbert L. Callaway and Charles T. Brock, Jr., both of Chicago, Ill.

Application October 19, 1954, Serial No. 463,165

4 Claims. (Cl. 107—25)

The present invention relates to dough-forming machines adapted for flattening a roll of dough and forming it into dough pieces such as biscuits, cookies, and the like.

The primary object of the present invention is to provide a machine for receiving a piece or roll of dough and discharging it as a series of formed dough pieces such as biscuits, cookies, tarts or other shapes and forms.

Another object of the present invention is to provide a machine having a pair of endless belts or conveyors which receive the dough piece or roll between them and by pressure of the belts or conveyors upon the dough piece or roll convert the dough into a web and deliver it to a cutting device which separates it into individual dough pieces.

A further object of the present invention is to provide a unitary machine enclosed within a housing having an inlet for the dough piece or roll and an outlet for the discharge of the dough pieces as formed within the housing, the inlet and outlet being at the same end of the housing.

A still further object of the present invention is to provide a unitary machine having a pair of endless belts or conveyors, the lower one of which may be moved upwardly and downwardly out of and into a pan in which flour may be placed so that the endless belt or conveyor may receive an application of flour to prevent the dough from sticking.

Yet another object of the present invention is to provide a unitary machine including a housing having endless belts removable from the housing for cleaning, and one which is simple in construction and economical to manufacture, as well as one which will expedite the manufacture of cookies, biscuits, or the like and will eliminate hand labor in such manufacture.

Figure 1:
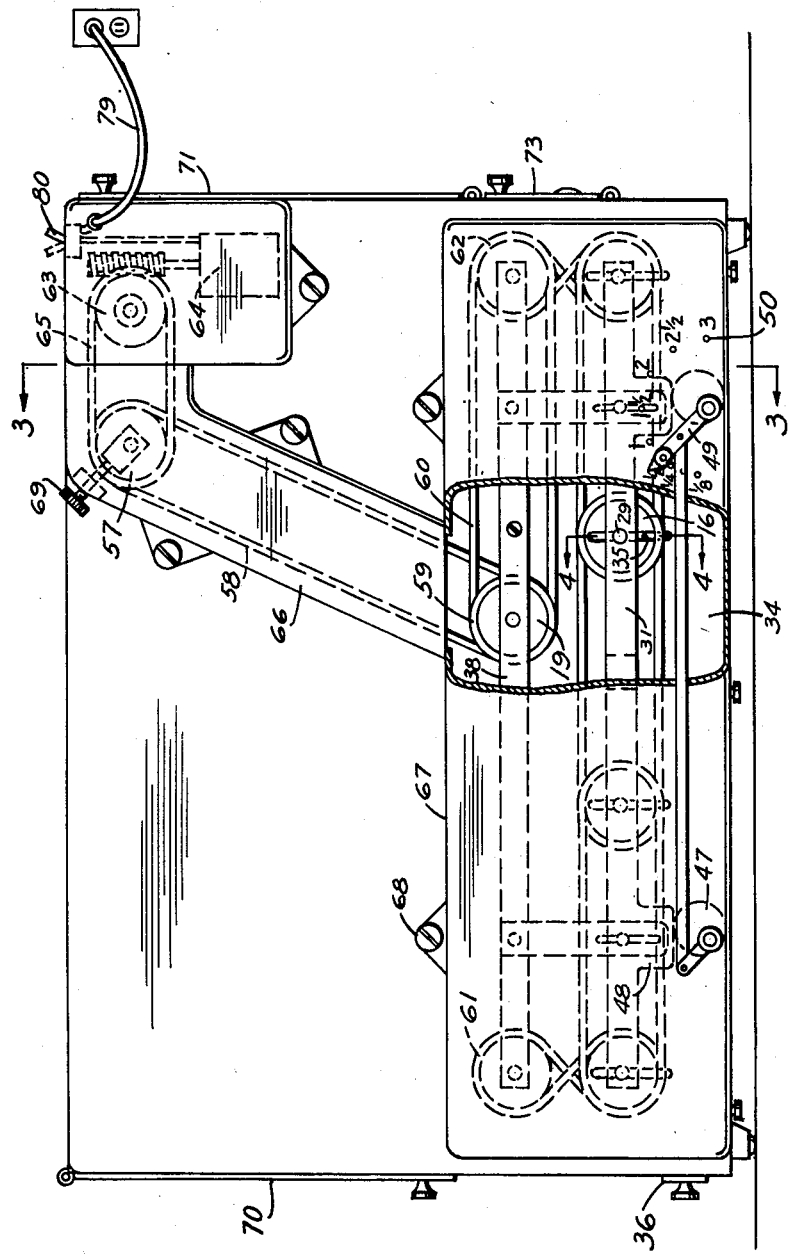
Figure 2:
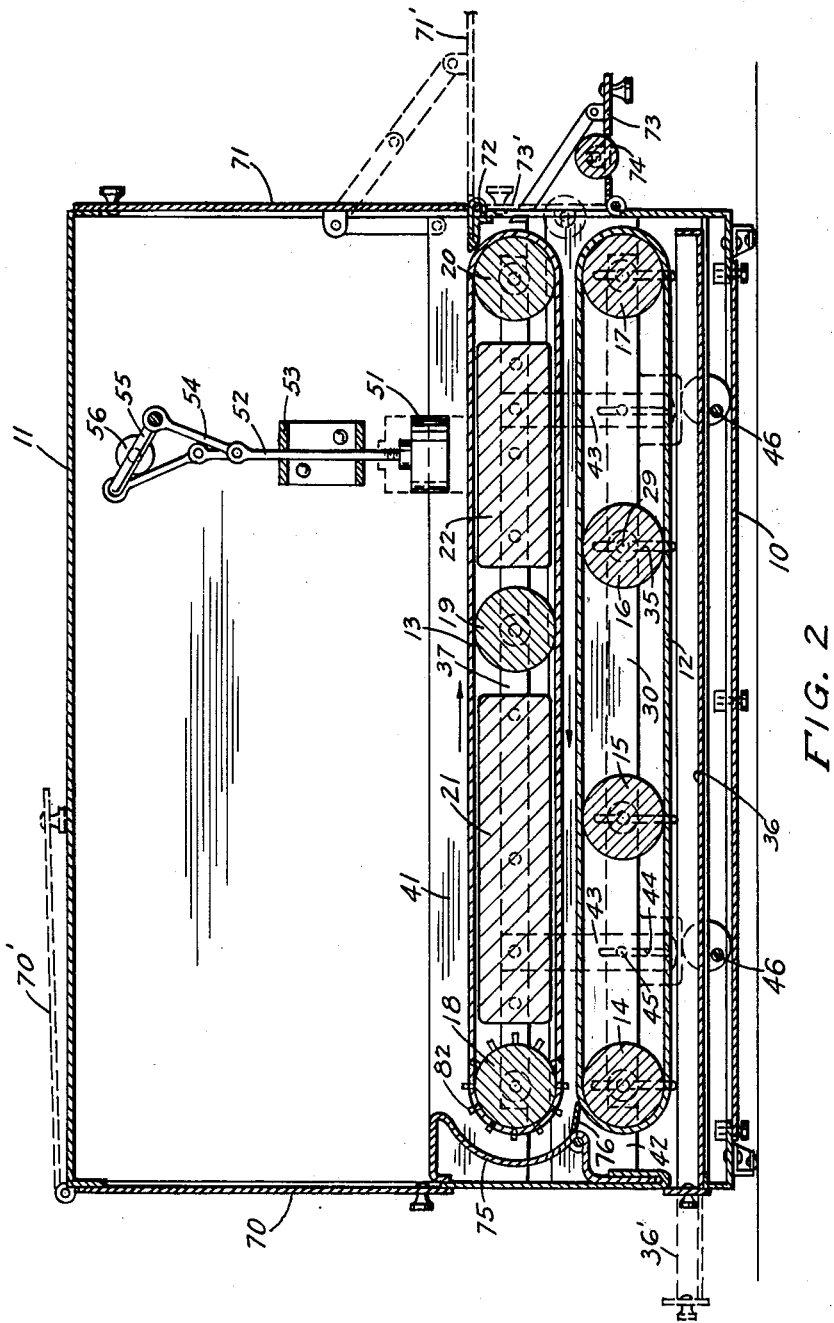

These and other objects and advantages of the present invention will be fully apparent from the following description when taken in connection with the annexed drawings, in which:

Figure 1 is a side view in elevation partially broken away to show some of the working elements of the present invention, Figure 2 is a side view in cross section showing some of the elements in side elevation, Figure 3 is an end view partially in cross section on line 3—3 of Figure 1, Figure 4 is a greatly enlarged detailed view partially in cross section taken on line 4—4 of Figure 1, Figure 5 is an end view in cross section on line 5—5 of Figure 4, and Figure 6 is a sectional view of one of the cutting elements of the present invention.

Referring in greater detail to the drawings in which like numerals indicate like parts throughout the several views, the invention is seen to consist of a base indicated by the reference numeral 10, and a housing or frame 11 arranged upstandingly over the base 10.

A pair of endless belts or conveyors 12 and 13 are positioned within the frame 11 in superimposed spaced relation with respect to each other. Each of the conveyors 12 and 13 are supported on a plurality of rollers. The lower conveyor 12, as shown in Figure 2, is seen to be supported on the rollers 14, 15, 16, and 17, while the upper one of the conveyors 13 is supported upon the rollers 18, 19, and 20, with the block 21 spaced between the rollers 18 and 19 and the block 22 spaced between the rollers 19 and 20.

Referring to Figures 3 and 4, the roller 16 is seen to be secured to a shaft 23 which terminates in a flat portion 24 which is received in the slot 25 formed in the bifurcated end 26 of a bushing 27 which is partially within the sleeve 28 and secured to one end of the shaft 29, as seen most clearly in Figure 4. The shaft 29 is supported in the horizontally disposed support bars 30 and 31, one on each side of the drive pulley 32, and the head 33 of the shaft 29 being peened over to prevent slipping of the bars on the shaft 29. The other end of roller 16 is similarly supported from a bar 30 extending along the other side wall of frame 11 (Fig. 3); and rollers 14, 15 and 17 are provided with shafts corresponding to shaft 29 and similarly supported in the bars 30 and 31.

The frame 11 is provided with a side wall 34 and the opposite side wall 34 which have vertically extending slots indicated by the reference numeral 35 in which the shafts 29 of the rollers 14, 15, 16, and 17 are movable up and down toward and away from a pan 36 carried by the base 10.

Each of the rollers 18, 19 and 20 are similarly journalled in bars 37 and 38. As seen in Figure 3 the roller 19 has its shaft 39 supported in a structure similar to that shown for shaft 23 in Figure 4, and a bushing 40, the shaft 39 being supported in an aperture in the wall 34.

Longitudinally extending within the frame 11 on each side of the conveyors 12 and 13 are side plates 41 and 42 which serve to keep the dough within the passage formed by the upper flight of the conveyor 12 and the lower flight of the conveyor 13, also within the space between the side edges of the upper flight of the upper conveyor 13.

The vertically extending connector bars 43 are secured to the outer bar 38 at their upper ends and each provided with a slot 44 in which a pin 45 is movable upwardly and downwardly to carry the outer bar 31 of the lower one of the conveyors, as shown most clearly in Figure 4. Bars 37 are similarly connected by bars 43 to the underlying bars 30.

A pair of rods 46 secured in holes formed in the walls 34 extend transversely across the frame above the base each being secured to the eccentric cam bodies 47 which are in engagement with the cam bars 48 on each side of the frame. The cam bars 48 support the support bars 31 for upward and downward movement as shifted by the handle 49 on the outside of the frame 11. The handle 49 has a protruding button which seats itself in any one of the holes indicated by the reference numeral 50 in Figure 1, there being suitable indicia adjacent to each of the holes to indicate the spacing of the upper flight of the conveyor 12 from the lower flight of the conveyor 13. It will be seen that the pan 36 extends and is movable out of the opening in one end of the frame to the position indicated in dotted lines in Figure 2 at 36'. In order to withdraw the pan 36, it is necessary to turn the crank 49 to raise the conveyor 12 above the sides of the pan. In its downward position, the conveyor 12 receives flour put in the pan in order that dough carried by the conveyors through the passage formed by the upper flight of one and the lower flight of the other will not adhere to the covering of the lower conveyor.

Within the frame above and spaced from the upper flight of the upper one of the conveyors, the conveyor 13 that is, is an assembly of dough piece-forming elements each consisting of a shaping device 51 connected on the lower end of a slidable shaft 52 journalled in a bracket 53 and connected at its upper end to the link 54 carried by the crank shaft 55.

Bushings 56 on each side of the frame 11 support the crank shaft 55 for rotative movement by means of which the piece-forming elements are movable toward and away from the upper flight of the conveyor 13. One end of the crank shaft 55 is provided with a pulley 57, and a belt 58 connects the pulley 57 with the pulley 59 shown in Figure 1, which is associated with the roller 19. A belt 60 connects the pulley 59 with the roller 20 and crossed belts 61 and 62 at each end of the frame connect the rollers 14 to the rollers 18, and the roller 17 to the roller 20, respectively. As shown in dotted lines in Figure 1 a main drive pulley 63 on the end of the shaft of a motor drive indicated by the reference numeral 64 is connected to the pulley 57 by another drive belt 65. Covers 67 are secured to the frame side wall 34 by means of the metal screws indicated generally by the reference numeral 68.

Means for adjusting the tension of the drive belt 65 and the belt 58 are provided in the knurled thumb screws 69, as shown in Figure 1.

The frame 11 is provided at one end with a hinged door 70 which is movable to the position shown in Figure 2 by the reference numeral 70' and at the other end is provided with another door 71 which is movable to the position, in the same figure, indicated by the reference numeral 71', at which position it forms a delivery table or shelf for the outlet of the machine and in longitudinal alignment with the upper flight of the upper conveyor 13. A formed bracket 72, as shown in Figure 2, bridges the gap between the end of the frame and the conveyor 13. Immediately below the bracket 72 is another door 73 swingable to the downward position and provided with a roller 74 which assists in the passage of a roll or lump of dough into the passage formed by the upper flight of the conveyor 12 and the lower flight of the conveyor 13, the action of the flights of the conveyors on the dough being to change the roll or lump of dough into a dough web. The door 73 is swingable upwardly to the position shown in dotted lines at 73' in Figure 2 to cover the inlet which is in alignment with the dough-forming passage. At the other end of the frame remote from the inlet is a curved plate 75, having substantially the same curvature as the roller 18 and extending from the point where the dough is delivered from the passage upwardly to a position where it will deliver the dough web to the upper flight of the conveyor 13. The curved plate 75 forms a transfer means for the dough and has a lip 76 which is in sliding contact with the surface of the conveyor 12.

In Figure 6, the dough piece forming element is shown in detail with the shaping device having tapering walls 77 and apertures 78 to permit the air to escape when the shaping device is pressed into the dough as it comes over the upper flight of the conveyor 13. It is important that the wall 77 have edges sharp enough to sever the dough without damaging the covering of the conveyor 13. The block 22 supports the conveyor in opposition to the stroke of the shaping device 51.

The motor drive 64 is provided with a connection 79 by means of which power may be supplied to it and a switch 80 is within convenient reach for control of the motor.

In operation, the dough is fed to the passage between the conveyor 12 and the conveyor 13 preferably in the shape of a long roll, although lumps may also be fed to it, the pressure of the surface of each of the conveyors and the constricted passage formed between the respective rollers and the blocks works the dough to a web form before it is discharged from the end of the passage and delivered to the top flight of the upper conveyor 13 where the reciprocating motion up and down of the shaping device 51 cuts the dough into suitable portions. Obviously, the shaping device may be of any form desired, for the purpose intended, whether to cut cookies, candy, biscuits, before it is delivered at the outlet. The feet 81 support the machine of the present invention upon any surface indicated by the reference numeral 82, in Figure 3. While not shown, some means of adjustment may be provided to keep each of the rollers operating on a horizontal axis. The rollers of each of the conveyors may be also provided with tightening devices in order that the coverings of the conveyors be kept in a taut condition. The roller 18 is formed with cleats or pins 82 which project through slots 83 in the cover of the upper conveyor to assist in carrying the dough to the upper flight of the conveyor 13.

An important feature of the invention is that the covers 67 on either side may be easily removed permitting the rollers to be readily removed from the frame for cleaning and sterilizing, the rollers each having the flat portion on its supporting shaft readily removable from the bushings which support them.

While only a single embodiment of the present invention has been here illustrated and described, it is believed that other embodiments may be made and practiced within the scope of the appended claims without departing from the spirit of the invention.

What is claimed is:

1. A dough piece forming machine comprising a base, an upstanding frame carried on said base, a pair of endless conveyors arranged in superimposed spaced relation positioned within said frame, each of said conveyors including a plurality of rollers rotatable about spaced horizontal axes and an endless belt running over said rollers, the belt of each conveyor having a horizontally disposed upper and a lower flight, the lower flight of the belt of the upper conveyor overlying and spaced from the upper flight of the belt of the lower conveyor and defining a dough web forming passage, a dough piece forming element positioned within said frame above and spaced from the upper flight of the upper conveyor and being movable toward and away from the upper flight of the upper conveyor, a block positioned in the space between the upper and lower flights of said upper conveyor and supporting said forming element, an inlet in said frame and in alignment with said passage for introducing dough to be formed into said passage, transfer means within said frame opposite to said inlet for directing the dough web discharged from said passage to the upper flight of the upper one of said conveyors, and an outlet in said frame spaced above said inlet for discharging the preformed dough pieces from the upper flight of said upper conveyor, said transfer means embodying a curved plate positioned in spaced relation with respect to the roller of the upper conveyor adjacent to the part of the frame opposite the inlet, and cleats carried by said last mentioned roller and projecting through the belt of said upper conveyor.

2. A dough piece forming machine comprising a base, an upstanding frame carried on said base, a pair of endless conveyors arranged in superimposed spaced relation position within said frame, each of said conveyors including a plurality of rollers rotatable about spaced horizontal axes and an endless belt running over said rollers, the belt of each conveyor having a horizontally disposed upper and a lower flight, the lower flight of the belt of the upper conveyor overlying and spaced from the upper flight of the belt of the lower conveyor and defining a dough web forming passage, the lower one of said conveyors being movable toward and away from the upper one of said conveyors, a dough piece forming element positioned within said frame above and spaced from the upper flight of the upper conveyor and being movable toward and away from the upper flight of the upper conveyor, a block positioned in the space between the upper and lower flights of said upper conveyor and supporting said forming element, an inlet in said frame and in alignment with said passage for introducing dough to be formed into said passage, transfer means within said frame opposite to said inlet for directing the dough web discharged from said passage to the upper flight of the upper one of said conveyors, and an outlet in said frame spaced above said inlet for discharging the preformed dough pieces from the upper flight of said upper conveyor, said transfer means embodying a curved plate positioned in spaced relation with respect to the roller of the upper conveyor adjacent to the part of the frame opposite the inlet, a lip on the lower end of said plate and in sliding contact with the upper flight of said lower conveyor, and cleats carried by said last mentioned roller and projecting through the belt of said upper conveyor.

3. A dough piece forming machine comprising a base, an upstanding frame carried on said base, a pair of endless conveyors arranged in superimposed spaced relation positioned within said frame, each of said conveyors including a plurality of rollers rotatable about spaced horizontal axes and an endless belt running over said rollers, the belt of each conveyor having a horizontally disposed upper and a lower flight, the lower flight of the belt of the upper conveyor overlying and spaced from the upper flight of the belt of the lower conveyor and defining a dough web forming passage, the lower one of said conveyors being movable toward and away from the upper one of said conveyors, a dough piece forming element positioned within said frame above and spaced from the upper flight of the upper conveyor and being movable toward and away from the upper flight of the upper conveyor, a block positioned in the space between the upper and lower flights of said upper conveyor and supporting said forming element, an inlet in said frame and in alignment with said passage for introducing dough to be formed into said passage, transfer means within said frame opposite to said inlet for directing the dough web discharged from said passage to the upper flight of the upper one of said conveyors, an outlet in said frame spaced above said inlet for discharging the preformed dough pieces from the upper flight of said upper conveyor, and means within said frame for applying flour to the lower one of said conveyors, said transfer means embodying a curved plate positioned in spaced relation with respect to the roller of the upper conveyor adjacent to the part of the frame opposite the inlet, a lip on the lower end of said plate and in sliding contact with the upper flight of said lower conveyor, and cleats carried by said last mentioned roller and projecting through the belt of said upper conveyor.

4. A dough piece forming machine comprising a base, an upstanding frame carried on said base, a pair of endless conveyors arranged in superimposed spaced relation positioned within said frame, each of said conveyors including a plurality of rollers rotatable about spaced horizontal axes and an endless belt running over said rollers, the belt of each conveyor having an upper and a lower flight, the lower flight of the belt of the upper conveyor overlying and spaced from the upper flight of the belt of the lower conveyor and defining a dough web forming passage, the lower one of said conveyors being movable toward and away from the upper one of said conveyors, a dough piece forming element positioned within said frame above and spaced from the upper flight of the upper conveyor and being movable toward and away from the upper flight of the upper conveyor, a block positioned in the space between the upper and lower flights of said upper conveyor and supporting said forming element, an inlet in said frame and in alignment with said passage for introducing dough to be formed into said passage, transfer means within said frame opposite to said inlet for directing the dough web discharged from said passage to the upper flight of the upper one of said conveyors, an outlet in said frame spaced above said inlet for discharging the preformed dough pieces from said upper conveyor, and a pan for flour detachably carried by said base within said frame and beneath the lower flight of the lower one of said conveyors, said lower conveyor belt being movable into said pan for the application of flour to said conveyor and out of said pan to permit removal of said pan from said frame.

References Cited in the file of this patent
UNITED STATES PATENTS

| | | |
|---|---|---|
| 829,270 | Harton | Aug. 21, 1906 |
| 2,289,388 | Stiles | July 14, 1942 |
| 2,595,305 | Scott | May 6, 1952 |